UNITED STATES PATENT OFFICE.

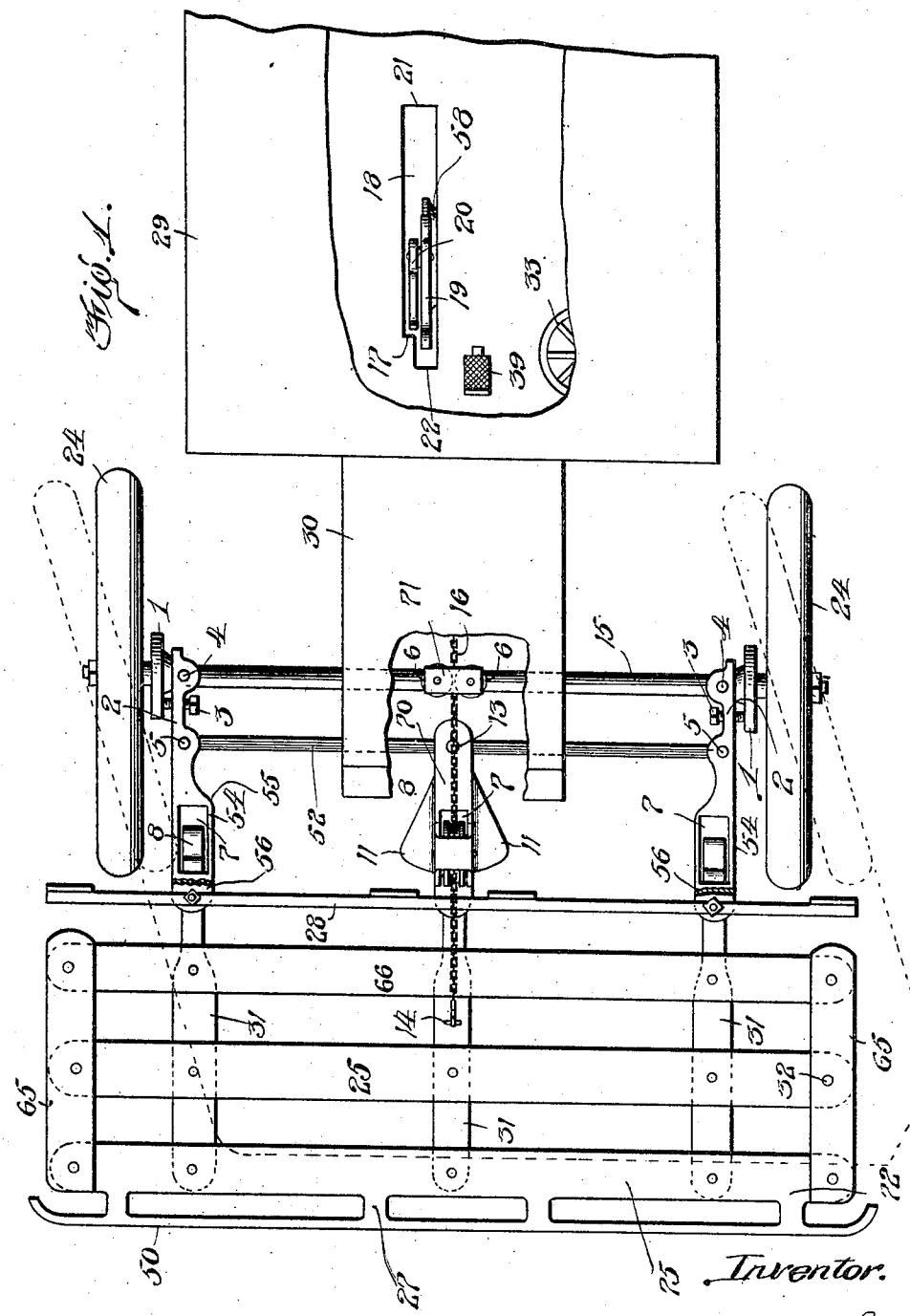

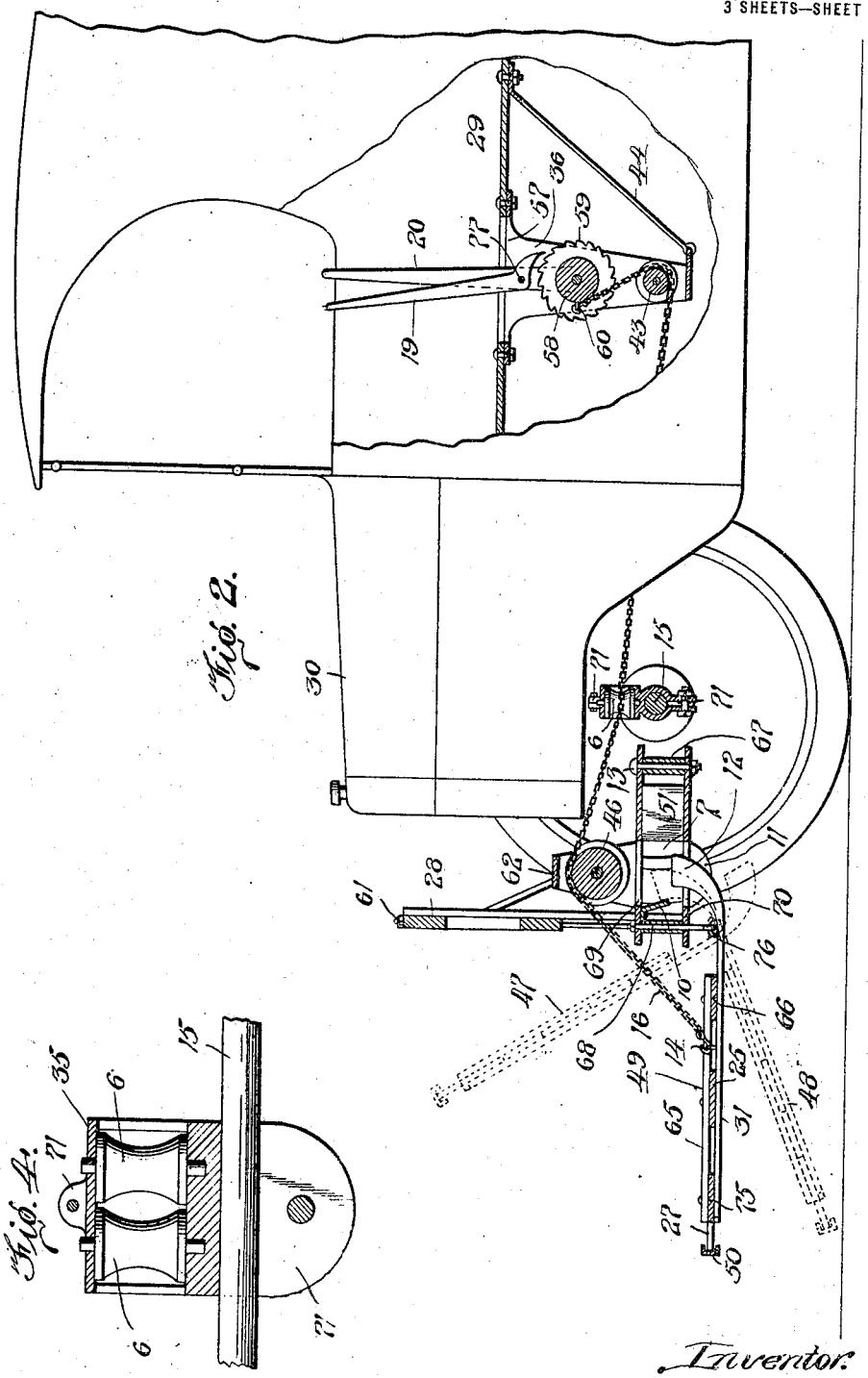

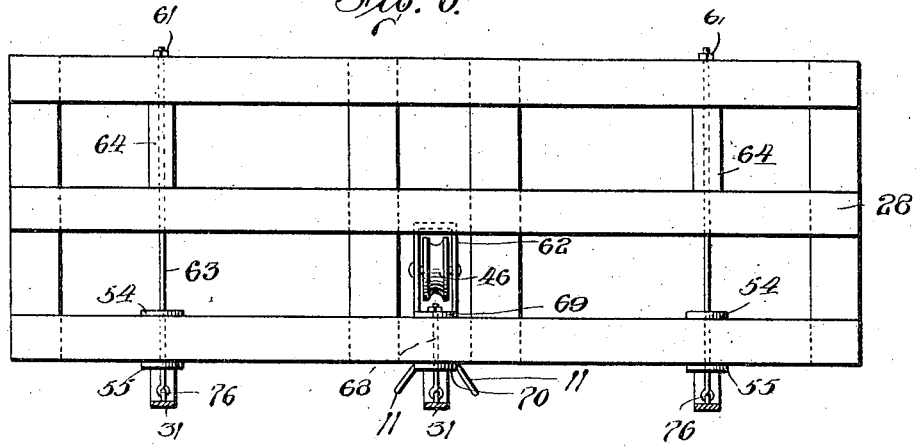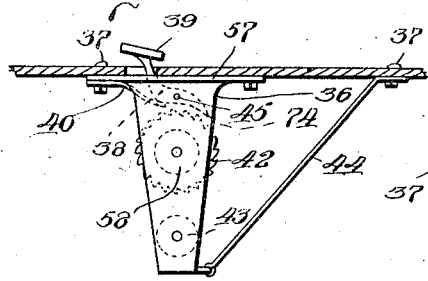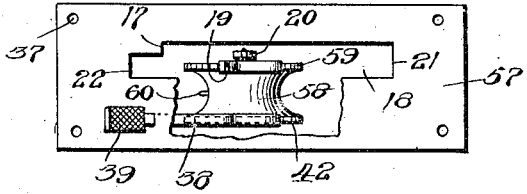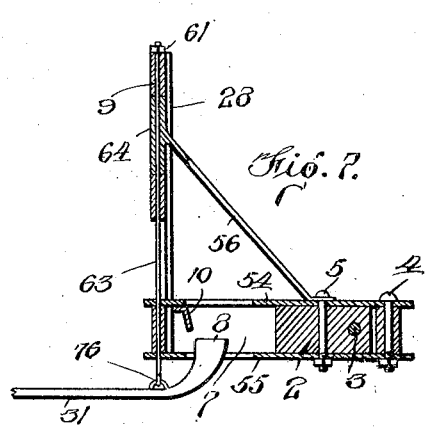

BENJIMIN J. LESLIE, OF CHICAGO, ILLINOIS.

VEHICLE-FENDER.

1,326,204.  Specification of Letters Patent.  Patented Dec. 30, 1919.

Application filed March 22, 1919. Serial No. 284,490.

*To all whom it may concern:*

Be it known that I, BENJIMIN J. LESLIE, a citizen of the United States, residing at Chicago, in the county of Cook and State of Illinois, have invented a new and useful Vehicle-Fender, of which the following is a specification.

This invention relates to the construction of a fender, and has for one object to provide a fender that will swing with the motion of the front wheels of a vehicle.

A further object of the invention is to provide a fender which is under perfect control of vehicle driver.

A still further object of the invention is to provide a fender which automatically swings in front of the front wheels of a vehicle, being operated by the ordinary steering mechanism of any vehicle.

A still further object is to provide a fender with an apron that can be instantly raised or lowered by the driver from his seat in the vehicle.

With these and other objects in view, as will more fully hereinafter appear, the invention consists in the novel construction and arrangement of parts hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the drawings, Figure 1, showing the general adjustment, is a view of bottom braces and their connection with spindle collar, showing apron, extension bars of apron adjusted in slots forming a rigid connection with spindle collar. Fig. 2 is a side elevation showing body of vehicle and fender apron cut along a line drawn through center of car from front to back. This shows the connection between the apron in front of vehicle and levers in body of vehicle and will be hereinafter described in detail. Fig. 3, view showing bracket bolted to floor of body of vehicle, foot pawl, foot pawl spring, ratchet, chain, pulley and stay. Fig. 4, section of center of axle carrying chain guide pulleys. Fig. 5 is a view showing top plate of bracket with section cut away showing chain drum, foot pawl, levers and slot. Fig. 6 is a plan view showing back of fender hinged to section of apron, eye-bolts and chain pulley. Fig. 7, is a vertical section of cross head and hinged braces.

In carrying out the present invention it will be necessary to form a combination with the steering device of any vehicle. There are several models of vehicles each having a spindle collar differing in size and shape, making it necessary to change the form and shape of cross head 2 to fit the various spindle collars. 1 is spindle collar pivoted to front axle 15; 2 is cross head with lips extended to receive collar pivot bolt 4; 3 is a set screw which passes through cross head 2 and enters spindle collar 1, forming a rigid connection with spindle collar 1. The cross head 2 has three solid extension braces 54, 55, 56, shown in Fig. 7; these braces extend forward to a point sufficient to allow the fender to swing clear of front wheels 24; these braces 54, 55 and 56 are provided with holes 9, corresponding with holes 9 in the vertical back 28. Hinge rods 63 pass through these corresponding holes 9, forming a hinge which hinges the vertical back 28 to braces 54, 55, 56, forming a combination that is forced to swing with the motion of the front wheels 24 of the vehicle as they are moved by the steering wheel 33. 76 indicates hinges formed by interlocking round metal eyes on extension bars 31 and the bent ends of rods 63; the apron 75 is attached to vertical back 28 and braces 54, 55, and 56 by means of hinges 76 a pivoted motion is transmitted to apron 75 which forces it to swing in front of wheels 24, as shown in dotted lines 34. This style of hinge allows apron 75 to be dropped to the surface of the street as shown in dotted line 48 of Fig. 2, or apron 75 may be instantly drawn up to dotted line 47, Fig. 2, by a pull on chain 16. This movement is sometimes necessary to avoid running into curbing or other obstructions while the vehicle is in motion. By a continued pull on chain 16, apron 75 is drawn up against the vertical back 28, where it will ride at ease when not in use. 68 is an eye bolt passing through brace 70, lower slat of vertical back 28 and brace 69 which is secured by lock nut 61. 31 indicates extension bars; these bars are turned upward at back end and enter slots 7, as shown at 8; this forms a rigid connection between brace 55 and extension bars 31. Lower brace 70 carries flanges 11, extending outward and downward. When the apron 75 is lowered and the ends 8 of extension bars fail to register with slots 7, the end of center extension bar 8 strikes flanges 11 and is held until a slight turn of the steering wheel 33 brings them to register. The apron 75 is held entirely by chain 16; from this position a slight pressure on foot pawl pedal 39 will drop apron 75 to the surface of the street. When apron 75 is dropped, the upturned ends 8 of extension bars 31 strike metal stop 10; this stop prevents the bumper from scraping the surface of the street. 65 designates metal shields to protect outer ends of apron slats 25, 66 and 72. Slats 25, 66 and 72 are riveted to extension bars 31 by rivets 32. All rivets in the apron are loosely drawn, forming pivots. This leaves apron 75 free to swing with the motion of the front wheels 24. In order to cover the front wheels 24 of vehicle, it is necessary to extend apron 75 and back fender 28 beyond the outside of wheels 24. 50 is a bumper bar; this bar is solidly attached to slat 72 by cross bars 27. 51 is a metal cross plate; this plate is solidly connected to top brace 69 and lower brace 70; this forms a rigid connection between vertical back 28 and cross bar 52, which prevents any vibration caused by chain 16 passing over pulley 46. 62 is a bracket mounted on brace 69; this bracket carries front chain pulley 46. 52 is cross bar pivoted at each end to crosshead 2 by pivot bolt 5. The center braces 69 and 70 straddle this bar 52 and are pivoted to its center by pivot bolt 13. 6 indicates guide pulleys which are mounted on center of front axle 15 of vehicle as shown in Fig. 4, and held by a split collar bracket 71. If preferred, guide pulley 6 may be mounted in brackets and bolted to the underside of floor of the vehicle 29. Chain 16 passes between these pulleys 6 and is thus held to the pivotal center of the fender and in line with front pulley 46 and back pulley 43, as the fender swings with the motion of front wheels 24. 43 is back chain pulley which carries chain 16 back under hood 30 and floor 29, to a point where levers 19 and 20 will enter the floor of vehicle body 29 in easy reach of the driver. 57 in Fig. 5 is a plate with a section broken away, showing chain drum 58; this plate is cut through center of chain drum 58. A pair of brackets are bolted to the underside of plate 58, as shown in 36, Fig. 2 and 36 Fig. 3. These brackets 36 carry chain pulley 43, foot pawl ratchet wheel 42, foot pawl 38, hand lever pawl 19, main lever 20 and foot pawl spring 40. Teeth are cut in the outer rims of chain drum 58, forming ratchet wheels 42 and 59. Foot pawl 38 is pivoted to bracket by pivot rivet 45. Foot pawl 38 passes up through bottom of vehicle body and forms foot pedal 39. Spring 40 is held in position by bolt 37. This spring extends back under pawl 38, the upward pressure forcing pawl bit 74 to engage ratchet wheel 42. Pivot rivet 77 pivots pawl lever 19 to main lever 20. Grasping levers 19 and 20 firmly at top forces pawl lever 19 to engage ratchet wheel 59. Loop 60, in the center of chain drum 58, is for the purpose of attaching chain 16 to drum 58, a hook being provided on the end of chain 16 for this purpose. 44 is a stay rod attached to the lower end of bracket 36 and bolted to the floor of vehicle body 29. This stay relieves the strain on spindle collar 1. The entire weight of apron 75 is carried by chain 16. The tension on the chain is counteracted by stay rod 44 and which prevents bracket 36 from being drawn forward. 18 is a slot. In raising and lowering apron 55, levers 19 and 20 play backward and forward in slot 18; near the front end of slot 18 is an offset 17. When levers 19 and 20 are brought forward main lever 20 strikes offset 17 and is stopped; from this position pawl lever 19 falls forward by gravity to the end of slot 22; this raises the bit of lever pawl 19 and releases ratchet 59. By grasping levers 19 and 20 and pulling them back to end 21 of slot 18 the chain 16 is wound around drum 50 and apron 75 is raised to an angle of 45 degrees, where it is held by foot pawl 38. Now bring levers 19 and 20 forward to the front end of slot 22 and by repeating the motion apron 75 is drawn to a vertical position. To lower apron 75 bring levers 19 and 20 back to 21, grasp levers firmly, release foot pawl 38 by pressure on pedal 39, and then bring levers 19 and 20 forward to 17, release foot pawl 38, allowing it to engage ratchet wheel 42 and this holds apron 75 at an angle corresponding with dotted lines 47; by repeating the operation the apron 75 will be lowered to horizontal position where it is held by chain 16. From this position a slight pressure on foot pawl pedal 39 will drop apron 75 to surface of the street as shown by dotted line 48. The lateral motion of the fender is transmitted by steering wheel 33 which changes the direction of the vehicle. 23 is a chain attached to apron 75 by an eyebolt and hook provided on chain 16 for that purpose. 67 is end of cross bar 52 cut in center at pivot bolt 13.

I am aware that prior to my invention vehicle fenders have been made pivoted for lateral extension. I therefore do not claim such a combination broadly.

I am also aware that prior to my invention vehicle fenders have been made hinged for elevating and lowering. I therefore do not claim such a combination broadly; but I claim:

1. In fenders for vehicles, the combination with the steering mechanism of vehicle, forwardly extending braces carrying an upright back, and a horizontal apron pivoted for lateral extension and hinged for elevating and lowering the same.

2. In fenders for vehicles, the combination with the steering mechanism of vehicle, forwardly extending braces carrying an upright back, a horizontal apron positioned in front of and in constant parallelism with front wheels of vehicle and means for swinging laterally as wheels change their course.

3. In fenders for vehicles, the combination with the steering mechanism of vehicle, forwardly extending braces carrying an upright back, a horizontal apron, extension bars with cross slats pivoted thereon, means for protecting the outer ends of cross slats, means for guiding extension bars to a rigid connection with steering mechanism when apron is lowered to a horizontal position.

4. In fenders for vehicles, the combination with the steering mechanism of vehicle, a fender having an upright back and a horizontal apron, means for preventing vibration, means for carrying a chain upward and backward, means for relieving tension on chain, said means comprising a brace extending backward.

5. In fenders for vehicles, the combination with the steering mechanism of vehicle, a fender having a horizontal apron, means for elevating, lowering and locking the same, said means comprising a chain attached to said apron and to a drum, and a ratchet mechanism for winding and controlling the drum.

6. In fenders for vehicles, the combination with the steering mechanism of vehicle, a horizontal apron, and means for locking said apron in rigid connection with steering mechanism when apron is in a horizontal position, same means being operable for releasing said rigid connection lock, when apron is elevated to an upright position.

7. In fenders for vehicles, the combination with the steering mechanism of vehicle, a horizontal apron, means for elevating, lowering and locking the same, said means comprising a chain attached to a drum, a locking ratchet to prevent the drum from turning in a direction to lower the apron, same means operable to release the drum; a lever and pawl positioned to engage and turn the drum in a direction to wind the chain in a direction to elevate the apron, same means operable to lower the apron when locking pawl is released, means for constant release of lever pawl when inoperative.

8. In fenders for vehicles, the combination with the steering mechanism of vehicle, a horizontal apron, a chain for elevating lowering and locking said apron, guide pulleys for holding said chain to the pivotal center of front axle as the wheels change their course.

9. In fenders for vehicles, the combination with the steering mechanism of vehicle, a horizontal apron, and means for locking said apron in rigid connection with steering mechanism when apron is in a horizontal position, same means being operable for releasing said rigid connection, when apron is elevated to an upright position.

10. In fenders for vehicles, the combination with the steering mechanism of vehicle, a horizontal apron, a chain for elevating, lowering and locking said apron, guide pulleys for holding said chain to the pivotal center of front axle as the wheels change their course.

BENJIMIN J. LESLIE.